(12) United States Patent
Kunze

(10) Patent No.: US 7,755,665 B2
(45) Date of Patent: Jul. 13, 2010

(54) METHOD AND APPARATUS FOR AUTOMATIC RECOGNITION OF THE RELATIVE MOTION DIRECTION OF AN OBJECT RELATIVE TO A MULTILINE CAMERA

(75) Inventor: Joerg Kunze, Ahrensburg (DE)

(73) Assignee: Basler AG, Ahrensburg (DE)

( * ) Notice: Subject to any disclaimer, the term of this patent is extended or adjusted under 35 U.S.C. 154(b) by 469 days.

(21) Appl. No.: 11/982,215

(22) Filed: Oct. 31, 2007

(65) Prior Publication Data
US 2008/0106618 A1    May 8, 2008

(30) Foreign Application Priority Data

Nov. 3, 2006    (DE) .................. 10 2006 052 440
Jan. 8, 2007     (DE) .................. 10 2007 001 760
Mar. 30, 2007   (DE) .................. 10 2007 015 320

(51) Int. Cl.
    *H04N 5/228*    (2006.01)
(52) U.S. Cl. ................ 348/208.1; 348/222.1
(58) Field of Classification Search ............... 348/208.1
    See application file for complete search history.

(56) References Cited

U.S. PATENT DOCUMENTS

| | | | | |
|---|---|---|---|---|
| 5,146,329 | A * | 9/1992 | Flamm | 348/607 |
| 5,347,308 | A * | 9/1994 | Wai | 375/240.23 |
| 7,522,221 | B2 * | 4/2009 | Swartz | 348/700 |
| 2007/0002146 | A1 * | 1/2007 | Tico et al. | 348/208.1 |

* cited by examiner

*Primary Examiner*—James M Hannett
(74) *Attorney, Agent, or Firm*—W. F. Fasse; W. G. Fasse

(57) ABSTRACT

A multi-line camera such as a two-line camera acquires image data of an object moving relative to the camera. An output of a first sensor line is connected through a first time-delay memory to a first comparator, and is connected directly to a second comparator. An output of a second sensor line is connected directly to the first comparator, and is connected through a second time-delay memory to the second comparator. Thus, the current image data of each sensor line is respectively compared crosswise to the time-delayed previous image data of the respective other sensor line. An evaluation unit compares the outputs of the two comparators, to determine which comparison had a better degree of correspondence, and dependent thereon determines the direction of relative motion of the object relative to the camera.

25 Claims, 3 Drawing Sheets

METHOD AND APPARATUS FOR AUTOMATIC RECOGNITION OF THE RELATIVE MOTION DIRECTION OF AN OBJECT RELATIVE TO A MULTILINE CAMERA

PRIORITY CLAIM

This application is based on and claims the priority under 35 U.S.C. §119 of German Patent Applications 10 2006 052 440.3 filed on Nov. 3, 2006, 10 2007 001 760.1 filed on Jan. 8, 2007, and 10 2007 015 320.3 filed on Mar. 30, 2007, the entire disclosures of which are incorporated herein by reference.

FIELD OF THE INVENTION

The invention relates to a method for automatically recognizing the direction of relative motion of an object relative of a multi-line camera from the image data of the image of the object.

BACKGROUND INFORMATION

A matrix camera includes a sensor with a surface made up of light sensitive pixels arranged in a two-dimensional array, for example including many lines of many pixels in each line. Thus, at any given moment, the sensor array can capture an image of an entire object, for example, if the entire object is imaged to fall completely onto the array. On the other hand, a line camera has a sensor that only has, for example, a single line of light sensitive pixels. A two-line camera has a sensor with two lines of light sensitive pixels. Thus, a single-line camera or two-line camera typically cannot simultaneously at one moment capture a complete image of the entire object to be imaged, but rather at any moment captures only a single line or two lines of pixels of an image of one or two lines of the object. The complete image of the entire object that is to be imaged is obtained only by the motion of the object relative to the camera, so that the one or two lines of light sensitive pixels can successively image or capture successive lines of the object until all of the lines of the object have been imaged in time succession. Typically, the motion of the object relative to the camera involves an orthogonal motion of the camera relative to the object or of the object relative to the camera. It is not significant whether the camera moves or the object moves or both the camera and the object move. Only the relative motion between the two is important.

Line cameras are often used for monitoring industrial production processes. In many cases of such industrial production monitoring, the object to be imaged is moved by means of a conveyor belt under a fixed or rigidly installed camera. For example, the objects on the conveyor belt are products being manufactured, which products are to be monitored for possible defects, damage, or failure to meet specifications, during the manufacturing process. For this purpose, pictures or images of the objects are produced by the line camera as the objects move through the field of view of the camera. The image data are automatically analyzed in a digital image processing arrangement connected to the camera. On the basis of this analysis, reject products, e.g. products with defects or damage, or products that fail to meet the required specifications, can be identified and sorted out of the production process.

In order to be able to correctly assemble the individual lines of image data generated by a line camera to produce a complete image of the object, and to be able to correctly interpret and evaluate the image, it is necessary to recognize the relative direction of motion of the camera and the object relative to one another. This is especially pertinent in the application of line cameras in so-called machine vision systems, in which various different relative motion directions and varying or changing motion directions can arise. In that regard, a line camera having exactly only one line of light sensitive pixels is conventionally known, whereby this camera is optimized for a bi-directional operation. A significant disadvantage of such a single line camera, however, is that the relative direction of motion cannot be determined solely from the acquired image data alone. Rather, in each case, either an additional sensor is necessary, or the human user of the system must input direction information in order to enable the relative direction of motion, and a possible change of the relative direction of motion, to be taken into consideration in the image processing. A further disadvantage of single line cameras is that they cannot provide redundant image data from the same single moment or point in time. Instead, only a single line of the object can be imaged at any given single point in time. While successive image points or lines can be recorded successively with successive time offsets, it is not possible to carry out a comparison of image data that were simultaneously recorded from spatially different parts of the object.

In this context, the image processing concept and term "optical flow" is also known. This term refers to a vector field that is produced in various optical technical methods, and that specifies the two-dimensional direction of motion and velocity of each image point or each pixel of an image sequence. Processing the data for the vector field is complicated and relatively computationally costly and time-consuming.

SUMMARY OF THE INVENTION

In view of the above, it is an object of the invention to provide a method that makes it possible to automatically determine or recognize the relative direction of motion between a multi-line camera, especially a two-line camera, and an object being imaged, wherein the recognition or determination of the relative motion direction is achieved solely from the acquired or recorded image data alone. It is a further object of the invention to provide an apparatus for carrying out such a method that does not require an additional sensor or user input for determining the relative motion direction. The invention further aims to avoid or overcome the disadvantages of the prior art, and to achieve additional advantages, as apparent from the present disclosure. The attainment of these objects is, however, not a required limitation of the claimed invention.

The object relating to a method of image processing for automatically recognizing the relative direction of motion between the multi-line camera and the imaged object is achieved according to the invention in such a method in which the current image contents of two image lines are crosswise compared with a time-offset or time-delayed signal of a respective other image line. In other words, the current image data of a first image line is compared with a time-delayed prior image data of a second image line, while the current image data of the second image line is compared with a time-delayed prior image data of the first image line, for example.

Further, according to a preferred feature of the invention, each image line is respectively sampled or imaged one time respectively by each one of the sensor lines, by triggering appropriately timed successive image capture cycles of the sensor lines as the object image moves over the image sensor.

Preferably in the inventive method, the time-offset or time-delay is achieved through the use of an image line trigger signal. Namely, the current image contents of each of the individual lines is compared with the respective signal of a respective other image line that has been delayed respectively by at least one image line trigger signal. Further advantageous method steps provide that the output signal is achieved by use of the trigger signal and/or use of a status estimator.

The above objects regarding the apparatus has been achieved according to the invention in an apparatus comprising a multi-line camera, and especially preferably a two-line camera, which comprises at least two lines of sensors, at least two time-delaying memory elements that are respectively individually associated and connected with the outputs of the sensor lines, and at least one image processing arrangement that is connected to an output of the memory elements. In a preferred embodiment, the image processing arrangement comprises at least two comparator units. A first one of the comparator units has a first input connected to an output of the first time-delaying memory element, and a second input connected directly (i.e. without an interposed time-delaying memory element) to the output of the second sensor line. A second one of the comparator units has a first input connected directly (i.e. without an interposed time-delaying memory element) to the output of the first sensor line, and a second input connected to the output of the second time-delaying memory element. Thus, each comparator unit is adapted to compare the current image data of one of the sensor lines with the time-delayed previous image data of another one of the sensor lines. Based on this comparison, the comparator determines how good a match or correspondence there is between the current image data of one of the sensor lines and the time-delayed previous image data of the other sensor line. The processing arrangement further includes a comparison evaluation arrangement that determines the relative direction of motion in response to and dependent on the outputs of the two comparator units, i.e. depending on which one of the comparator units indicates a better correspondence.

In further preferred embodiment features of the invention, the output signal can be produced by the apparatus incorporating and using the trigger signal and/or a status estimator in the processing arrangement.

A first advantage of the invention is that the relative direction of motion between the object and the camera can be determined directly from the image data of the two-line camera. If the time-delay sufficiently closely matches the actual speed of the relative motion, in consideration of the trigger signal period, then, for example, there will be a close correspondence between the current image data from the second sensor line and the time-delayed previous image data from the first sensor line if the image is moving in a direction from the first sensor line to the second sensor line. On the other hand, with such a motion direction, the opposite comparison, i.e. comparing the current image data from the first sensor line with the time-delayed previous image data from the second sensor line, will generally not give a close correspondence (assuming that the actual object presents different image data on successive lines thereof). The opposite will pertain in the case of the opposite relative direction of motion. Thus, the direction of relative motion can be determined in response to and dependent on which comparison provides a closer correspondence of the compared image data. If the better correspondence is not up to a desired level of correspondence or accuracy, then the time-delay can be adjusted over successive iterations, to achieve an improved match between the time-delay and the speed of relative motion, further in consideration of the trigger signal period, and thus a better correspondence of the compared image data.

A further advantage of the invention is that a reversal or change of the direction of relative motion can also be immediately recognized directly from the image data of the two-line camera. Furthermore, within the limits of the image line trigger signal being used, not only the quality or nature of the direction change, but also the magnitude or significance thereof, can be determined. Thus, the invention makes it possible to operate a two-line camera in combination with a digital image processing arrangement, for determining the direction, speed, and direction change of the relative motion of the object relative to the camera, without the need of an additional sensor for detecting a possibly arising direction change. In that regard, according to the invention, a two-line camera is operated so that each image line is respectively sampled or sensed respectively once by each one of the two sensor lines, and is thus sampled or sensed plural times. The inventive crosswise comparison of the current image data or contents of one single sensor line with the respective previous image data output signal that has been time-delayed respectively by one image line trigger, of the other image line, serves to determine the direction of better correspondence of the crosswise compared image data. The use of the image line trigger signal according to a further advantageous embodiment of the invention, and the associated possible use of a status estimator unit, makes it possible to generate a particularly robust output signal.

The inventive method and apparatus relate not only to two-line cameras but also to multi-line cameras having more than two sensor lines. The inventive method and apparatus achieve the automatic direction recognition in such multi-line cameras without requiring additional components such as additional sensors for detecting the motion direction and direction change. Furthermore, the inventive method and apparatus operate especially quickly, because the image processing is carried out in real time, with only a time-delay of a single trigger signal or a single sample and hold period, and does not need to be carried out subsequently after the entire image data has been acquired. The image processing circuitry is also rather simple, so that the inventive method and apparatus can be carried out in an economical and reliable manner. It is further possible according to the invention, to attach or append direction information, e.g. a so-called direction stamp, to the image data or contents.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF PREFERRED EXAMPLE EMBODIMENTS AND THE BEST MODE OF THE INVENTION

Figure 1:
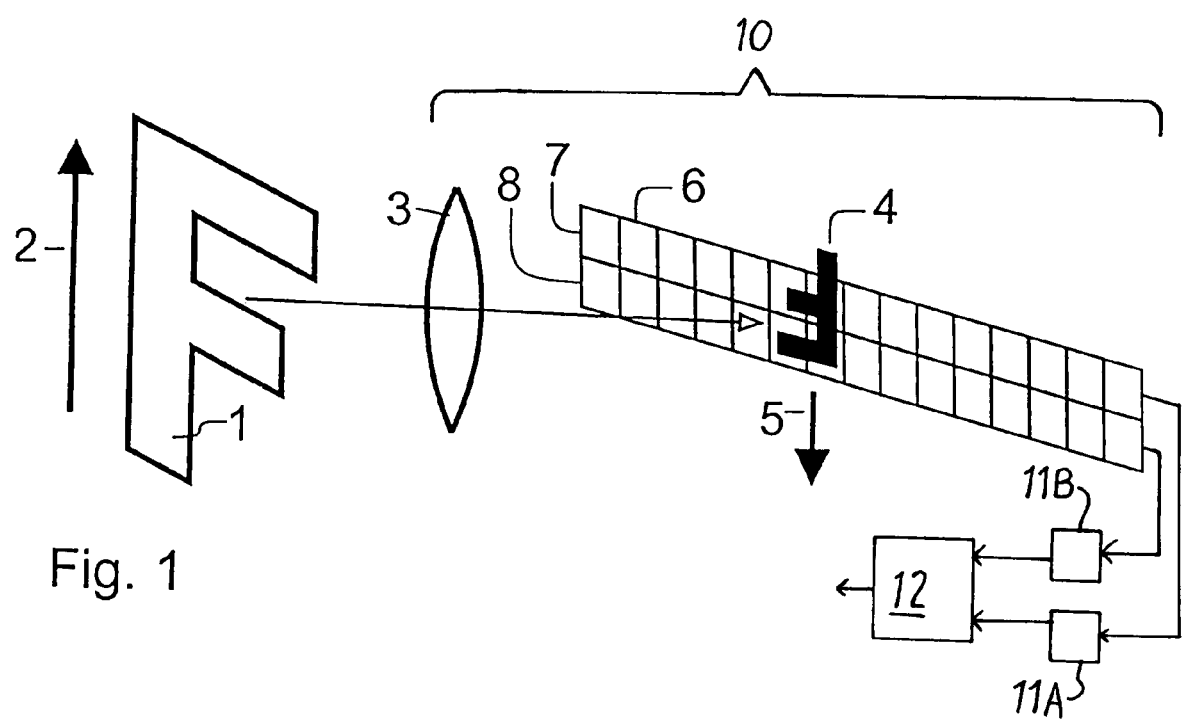
FIG. 1 is a schematic diagram of the general principle of the inventive method and apparatus with a two-line camera for imaging a subject object.

FIG. 1 schematically illustrates the general principle of the image acquisition and processing in the method and apparatus according to the invention. The apparatus includes e.g. a two-line camera 10 that comprises an optic system such as an imaging lens 3 as well as an image sensor 6 having e.g. two sensor lines 7 and 8 of light sensitive pixels. A subject object 1 moves in the direction 2 relative to the camera 10, whereby the arrow represents the direction 2 of the physical motion of the object 1 relative to the camera 10. A reversed image 4 of the object 1 is projected through the imaging lens 3 onto the image sensor 6. Due to the physical motion of the object 1 in the direction 2, the reversed image 4 moves oppositely in the virtual image direction 5 across the first sensor line 7 and the second sensor line 8 of the image sensor 6. The sensor lines 7 and 8 are triggered by a trigger signal to successively acquire or capture image data of the image 4 being projected on and moving across the sensor lines 7 and 8. Thereby the image data is sampled or acquired and read-out from the sensor lines at successive times determined by the trigger signal.

The output signals of the two sensor lines 7 and 8 are respectively provided, once through a respective time-delaying memory element 11A or 11B, and once directly, to an image processing unit 12. Thus, the image processing unit can process the signals or image data from the same object line as acquired at two different times in succession, namely once by the first sensor line 7 and a second time by the second sensor line 8. For example, the processing unit 12 can compare these two image data to each other as will be described in further detail below. Thus, the two single line image sensor signals, which are associated with the same image line, are further processed in a combined or superimposed manner in a suitable mathematical processing module, for example by addition, average value formation, comparison, etc. Thereby, the direction 5 of the motion of the image 4 across the sensor 6, and therewith the direction 2 of physical motion of the object 1 relative to the camera 10, can be determined from the image data. Thereby furthermore an output signal can be produced that has a higher dynamic range or a better signal-to-noise ratio than each of the individual line signals alone.

Figure 2:
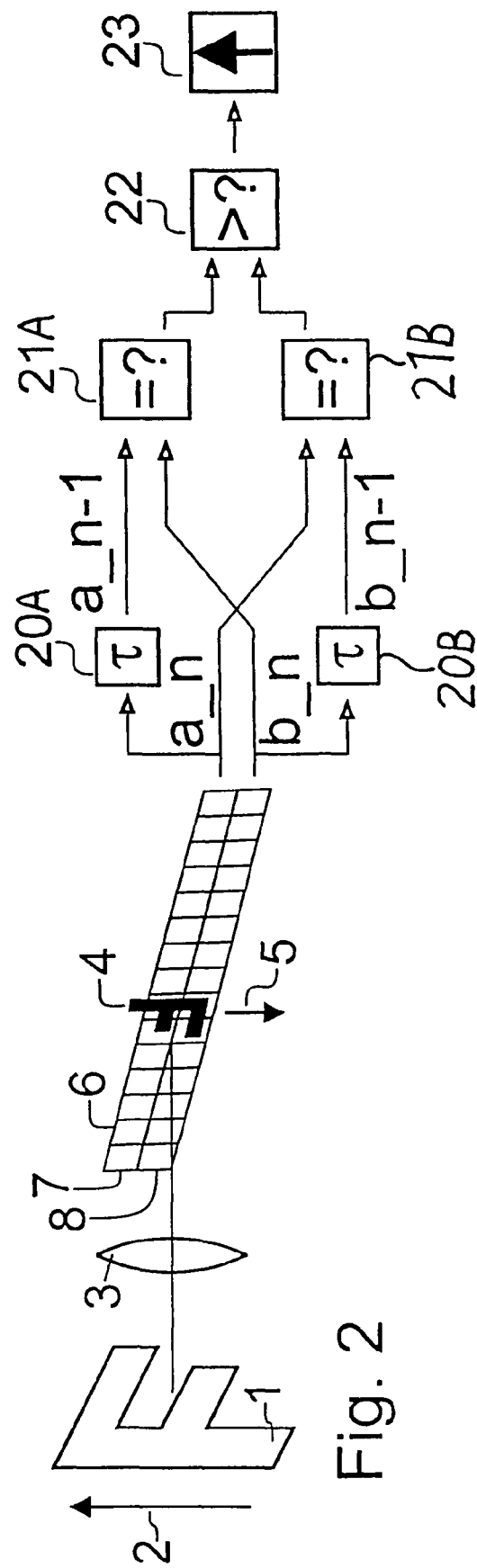
FIG. 2 is a schematic diagram showing further details in comparison to FIG. 1, of a first embodiment of an apparatus for the automatic recognition of the direction of relative motion of the object relative to the camera.

Further details of one embodiment of the inventive method and apparatus will now be described in connection with FIG. 2. FIG. 2 further builds on the general principle of FIG. 1. The output signals of the two sensor lines 7 and 8 are represented by image signal vectors $a\_n$ and $b\_n$, which are each provided respectively to the input of a respective time-delay memory element 20A or 20B respectively. The time-delay memory elements 20A and 20B respectively time-delay the signals by a time period corresponding to one line of the image, to produce respective time-delayed signals $a\_n-1$ and $b\_n-1$. These time-delayed signals are each respectively provided to one input of a comparator unit 21A or 21B. The comparator units 21A and 21B each have a second input that is respectively connected directly, i.e. without a time-delay, to the output of the other sensor line.

Thus, the first comparator unit 21A receives the time-delayed prior output signal of the first sensor line 7 through the first time-delay memory element 20A, and the current (non-delayed) output signal of the second sensor line 8, and compares these two signals. Similarly, the second comparator unit 21B receives the time-delayed prior output signal of the second sensor line 8 through the second time-delay memory element 20B, and the current (non-delayed) output signal of the first sensor line 7, and then compares these two signals. Thereby the processing circuit establishes a crosswise comparison in which the time-delayed prior signals $a\_n-1$ and $b\_n-1$ of the sensor lines 7 and 8 are respectively compared with the current non-delayed signals $b\_n$ and $a\_n$ respectively of the opposite sensor line 8 or 7 respectively. This comparison can be a pure logic comparison, or other types of comparison as discloses herein, or equivalents thereof.

Basically, the comparisons carried out in the comparator units 21A and 21B determine how close the correspondence is between the two image data sets being compared. In the presently described example embodiment, the comparator units 21A and 21B determine and output a respective indication or measure of the degree of equality or correspondence between the compared image data sets according to a suitable mathematical comparison process. For example, the comparison can be based on the Euclidian spacing distance between corresponding image data vectors, or by determining the image data vector spacing according to a different norm or standard. Alternatively, the comparison can be carried out using a correlation sum of the two image data vectors.

The output signals of the two comparator units 21A and 21B representing the determined indicator or measure of the equality correspondence of the respective compared image data sets are provided to the two inputs of a subsequently connected comparison evaluation arrangement 22. This comparison evaluation arrangement 22 finally determines and indicates the direction of motion 23 in a suitable output signal, i.e. which gives the direction 5 or the direction 2 as desired, in response to and dependent on the outputs of the two comparator units 21A and 21B. This recognition of the direction of motion is based on the determination of which one of the two comparisons in the comparator unit 21A or the comparator unit 21B indicated the better degree of correspondence of the compared image data. Namely, due to the relative motion, either the image data of the signal $a\_n$ and the image data of the signal $b\_n-1$ would be substantially identical, or alternatively the image data of the signal $b\_n$ and the image data of the signal $a\_n-1$ would be substantially identical, depending on the direction of motion of the object 1. In this regard, if the amount of time-delay applied in the time-delay memory elements 20A and 20B exactly matches the speed of the relative motion with consideration of the sensor line trigger period, so that a given line of the image falls on one sensor line at a first triggered time point and has moved to the next sensor line at the second trigger time point, then the image correspondence in the "correct" one of the comparator units will be identical. Otherwise there will not be perfect identity or correspondence, but there would still be a better correspondence in one comparator unit than in the other comparator unit. The time-delay is to be set or selected based on the expected speed of the relative motion, and can be adjusted over successive operating cycles to achieve an improving accuracy of the identity or correspondence. Generally, "identical" or "substantially identical" image data or image contents simply mean a sufficiently high degree of correspondence or similarity in one comparator unit compared to that determined in the other comparator unit, to reach a conclusion as to which correspondence is better, so as to thereby reach a conclusion of the direction of relative motion.

Figure 3:
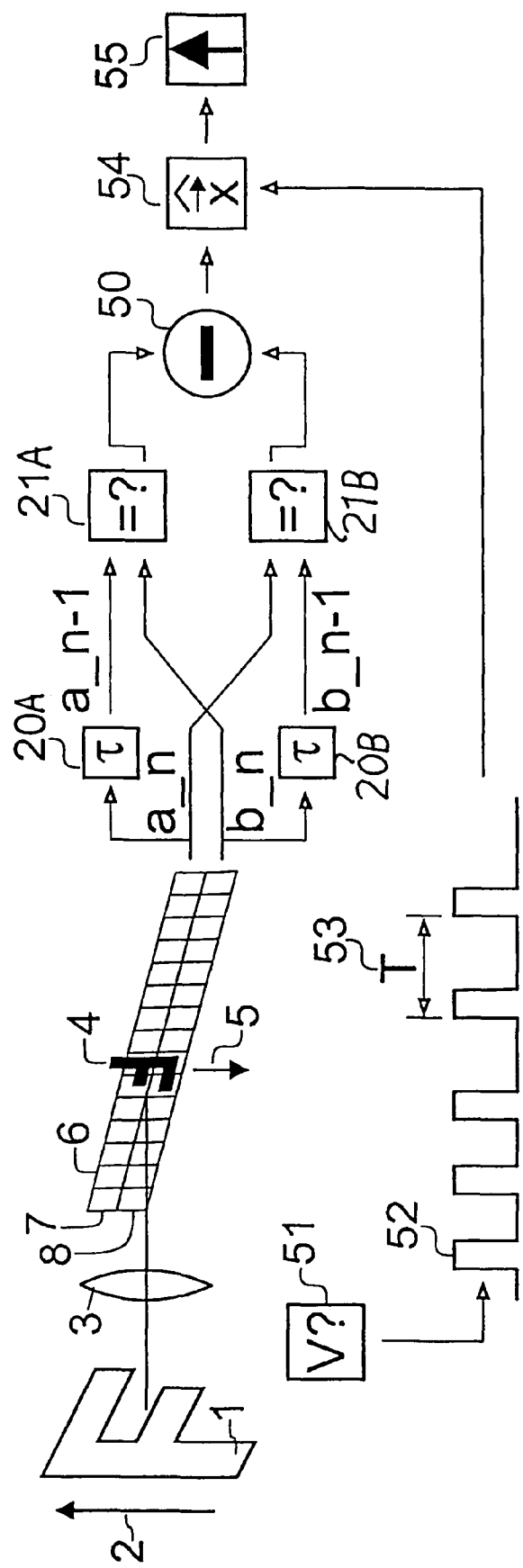
FIG. 3 is a schematic diagram of an alternative second embodiment of an apparatus for the automatic recognition of the direction of relative motion.

The method described in connection with FIG. 2 leads to a robust determination or result if the image has a sufficient contrast of successive lines of the image in the direction 5 of motion of the image over the sensor 6. In order to make the method more robust, a preferred embodiment of the inventive method uses the inventive embodiment of the apparatus as shown in FIG. 3. The basic construction and operation are the same as in FIG. 2, and a description thereof will not be repeated here as to the elements having the same reference numbers as in FIG. 2.

In the further developed embodiment of FIG. 3, the outputs, i.e. the equality or correspondence measures output by the two comparator units 21A and 21B, are provided to two inputs of a further comparator unit 50, which is embodied as a difference forming unit 50 in the present example. This further comparator unit 50 combines the two outputs of the comparator units 21A and 21B in such a manner, to provide an output information regarding the direction of the relative motion (represented by the sign of the difference in the present example), and regarding the magnitude or significance of the motion (represented by the magnitude of the difference in the present example). This output information is then provided to a status estimating unit 54 that applies a suitable mathematical process, such as a linear status estimation in the present example, to produce a stable final output signal 55 indicating the direction and magnitude of the relative motion. In a preferred example, the status estimating unit 54 may comprise a Kalman filter. Of course, it is alternatively possible to produce the stable output signal 55 of the status estimating unit 54 through use of a different mathematical process, such as in connection with threshold values, non-linear status estimations, or through use of hysteresis.

Furthermore, the arrangement shown in FIG. 3 can also evaluate the signal with respect to the speed or velocity of the relative motion 2 of the object 1, which is detected with a suitable measuring device 51, such as an encoder 51 in the present example embodiment. The measuring device 51 provides the speed information in the form of a corresponding trigger signal 52 to the camera 10. In this regard, either the period duration 53 or the frequency of the trigger signal is determined, and the result thereof is provided to another input of the status estimating unit 54. Since the relative motion of the object 1 generally is of a mechanical nature, any reversal of the direction 2 is associated with a deceleration, a zero-crossing of the speed, and an acceleration in the opposite direction, which is associated with or characterized by a high period duration 53 or a short trigger pulse frequency of the trigger signal 52. By providing the trigger signal 52 to the status estimating unit 54, the unit 54 can better recognize the exact time point of a possible direction reversal, for example by carrying out a threshold value comparison. Thus, with this additional information, the status estimating unit 54 can provide an especially reliable output signal 55.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An image acquisition and processing system comprising:
    a multi-line camera comprising an image sensor having at least a first sensor line and a second sensor line,
    a first time-delay memory connected to an output of said first sensor line;
    a second time-delay memory connected to an output of said second sensor line;
    a first comparator unit having a first input connected to an output of said first time-delay memory and having a second input connected to said output of said second sensor line;
    a second comparator unit having a first input connected to said output of said first sensor line and having a second input connected to an output of said second time-delay memory; and
    a processing arrangement having two inputs connected to respective outputs of said first and second comparator units, and having an output.

2. The system according to claim 1 for acquiring and processing an image of an object, wherein said processing arrangement at said output thereof is adapted to produce an output signal indicative of and dependent on a relative direction of motion between the object and said camera.

3. The system according to claim 2,
    wherein said first comparator unit is adapted to produce at said output thereof a first comparator output signal indicative of a degree of correspondence between time-delayed previous first line image data received at said first input of said first comparator unit and current second line image data received at said second input of said first comparator unit;
    wherein said second comparator unit is adapted to produce at said output thereof a second comparator output signal indicative of a degree of correspondence between current first line image data received at said first input of said second comparator unit and time-delayed previous second line image data received at said second input of said second comparator unit; and
    wherein said processing arrangement is adapted to produce said output signal thereof in response to determining which one of said first comparator output signal or said second comparator output signal indicates a higher said degree of correspondence.

4. The system according to claim 2, wherein said processing arrangement is further adapted to produce said output signal being further indicative of and dependent on a magnitude of relative motion between the object and said camera.

5. The system according to claim 2, wherein said processing arrangement is adapted to produce said output signal indicative of and dependent on said relative direction of motion between the object and said camera based solely on image data obtained from said image sensor, and said image acquisition and processing system does not include any additional sensor adapted to sense a relative direction of motion or motion reversal between the object and said camera.

6. The system according to claim 1, wherein said camera is a two-line camera and has a total of exactly two sensor lines being said first sensor line and said second sensor line.

7. The system according to claim 1, wherein each one of said sensor lines respectively comprises a row of plural light-sensitive sensor pixels.

8. The system according to claim 1, wherein said processing arrangement comprises a comparison evaluation arrangement adapted to evaluate respective output signals of said outputs of said first and second comparator units to determine which one of said output signals of said comparator units indicates a higher degree of correspondence between inputs respectively being compared in each one of said comparator units.

9. The system according to claim 1, wherein said processing arrangement comprises a further comparator unit having said two inputs respectively connected to said respective outputs of said first and second comparator units.

10. The system according to claim 1, wherein said processing arrangement comprises a difference forming unit having said two inputs respectively connected to said respective outputs of said first and second comparator units.

11. The system according to claim 1, wherein said processing arrangement comprises a status estimating unit interposed between said two inputs and said output of said processing arrangement.

12. The system according to claim 11, wherein said status estimating unit comprises a Kalman filter.

13. The system according to claim 1, further comprising a measuring device adapted to produce a trigger signal that is connected and provided to said image sensor to trigger image acquisition by said image sensor, and that is connected and provided to a further input of said processing arrangement.

14. A method of acquiring and processing image data of an image of an object moving relative to a camera, comprising the steps:
- a) directing an image of said object onto a multi-line image sensor of said camera including at least a first sensor line and a second sensor line;
- b) with said first sensor line, producing first sensor line image data;
- c) with said second sensor line, producing second sensor line image data;
- d) time-delaying said first sensor line image data to produce first time-delayed image data;
- e) time-delaying said second sensor line image data to produce second time-delayed image data;
- f) comparing said first time-delayed image data with said second sensor line image data to produce a first comparison result;
- g) comparing said second time-delayed image data with said first sensor line image data to produce a second comparison result; and
- h) evaluating said first comparison result and said second comparison result to determine dependent thereon a direction of relative motion between said object and said camera, and producing an output signal indicative of said direction of relative motion.

15. The method according to claim 14,
further comprising repeating said steps b), c), d), e), f) and g) in successive cycles including a current cycle and a prior cycle that was carried out prior to said current cycle;
wherein said object moves relative to said camera and said image moves relative to said image sensor between said successive cycles; and
wherein said time-delaying respectively involves a time-delay of at least one of said cycles so that said time-delaying of said first sensor line image data in said step d) of said prior cycle produces said first time-delayed image data for said comparing in said step f) in said current cycle, and said time-delaying of said second sensor line image data in said step e) of said prior cycle produces said second time-delayed image data for said comparing in said step g) in said current cycle.

16. The method according to claim 15, wherein said repeating of said steps b) and c) in said successive cycles is triggered by a trigger signal, an amount of time-delay applied in said time-delaying in said steps d) and e) corresponds to at least one period of said trigger signal, and by said comparing in said steps f) and g) current data values of said sensor line image data produced respectively by each one of said sensor lines in said current cycle are compared with prior data values of said sensor line image data produced respectively by a respective other one of said sensor lines in said prior cycle which is one or more cycles prior to said current cycle.

17. The method according to claim 16, further comprising inputting and utilizing said trigger signal in said evaluating in said step h).

18. The method according to claim 14, wherein said evaluating in said step h) is carried out at least partly in a status estimating unit.

19. The method according to claim 14, wherein said steps b) and c) are repeated in successive cycles such that each image line of said image is imaged once by each one of said sensor lines in said successive cycles to produce a respective set of said sensor line image data.

20. The method according to claim 14, wherein said evaluating in said step h) comprises an evaluation using at least one of a threshold value comparison, a status estimation based on hysteresis, a linear status estimation, or a non-linear status estimation.

21. The method according to claim 14, wherein said first comparison result is produced to be indicative of a first degree of correspondence between said first time-delayed image data and said second sensor line image data, said second comparison result is produced to be indicative of a second degree of correspondence between said second time-delayed image data and said first sensor line image data, and said evaluating in said step h) comprises determining which one of said first and second degrees of correspondence is greater and producing said output signal dependent thereon.

22. The method according to claim 14, wherein said first comparison result is produced to be indicative of a first degree of correspondence between said first time-delayed image data and said second sensor line image data, said second comparison result is produced to be indicative of a second degree of correspondence between said second time-delayed image data and said first sensor line image data, and said evaluating in said step h) comprises determining a difference between said first and second degrees of correspondence and producing said output signal dependent thereon.

23. The method according to claim 14, wherein said step h) further comprises producing said output signal to be indicative of a magnitude of a velocity of said relative motion.

24. The method according to claim 14, further comprising attaching a direction stamp indicative of said direction of relative motion onto said first or second sensor line image data.

25. A method of acquiring and processing image data of an image of an object moving relative to a camera, comprising the steps:
- a) directing an image of said object onto a multi-line image sensor of said camera including at least a first sensor line and a second sensor line;
- b) in successive cycles including an earlier cycle and a later cycle after said earlier cycle, producing with said first sensor line, earlier first image data during said earlier cycle and later first image data during said later cycle;
- c) in said successive cycles, producing with said second sensor line, earlier second image data during said earlier cycle and later second image data during said later cycle;
- d) determining a first degree of correspondence between said earlier first image data and said later second image data;
- e) determining a second degree of correspondence between said earlier second image data and said later first image data;
- f) determining which one of said first or second degree of correspondence indicates a closer correspondence, and dependent thereon producing an output signal indicative of a direction of relative motion between said object and said camera.

* * * * *